United States Patent
Nannipieri et al.

(10) Patent No.: US 10,066,972 B2
(45) Date of Patent: Sep. 4, 2018

(54) METHOD AND APPARATUS FOR MEASURING A DISTRIBUTED PHYSICAL VALUE OF AN OPTICAL DEVICE UNDER TEST

(71) Applicant: INFIBRA TECHNOLOGIES S.R.L., Pisa (IT)

(72) Inventors: Tiziano Nannipieri, Cascina (IT); Alessandro Signorini, Ponsacco (IT); Mohammad Taki, Monserrato (IT); Stefano Faralli, Grosseto (IT); Fabrizio Di Pasquale, Pisa (IT)

(73) Assignee: INFIBRA TECHNOLOGIES S.R.L., Pisa (IT)

( * ) Notice: Subject to any disclaimer, the term of this patent is extended or adjusted under 35 U.S.C. 154(b) by 55 days.

(21) Appl. No.: 15/326,902

(22) PCT Filed: Jun. 15, 2015

(86) PCT No.: PCT/EP2015/063365
§ 371 (c)(1),
(2) Date: Jan. 17, 2017

(87) PCT Pub. No.: WO2016/008662
PCT Pub. Date: Jan. 21, 2016

(65) Prior Publication Data
US 2017/0205255 A1    Jul. 20, 2017

(30) Foreign Application Priority Data
Jul. 17, 2014    (IT) .............................. AR2014A0040

(51) Int. Cl.
*G01D 5/353*    (2006.01)
*G01M 11/00*    (2006.01)
*H04B 10/516*    (2013.01)

(52) U.S. Cl.
CPC ..... *G01D 5/35364* (2013.01); *G01D 5/35361* (2013.01); *G01M 11/3118* (2013.01); *H04B 10/516* (2013.01)

(58) Field of Classification Search
CPC ........... G01D 5/35364; G01D 5/35361; H04B 10/516; G01M 11/3118
(Continued)

(56) References Cited

U.S. PATENT DOCUMENTS

| 9,602,228 B1 * | 3/2017 | Warnes ................... H04L 27/04 |
| 2010/0067914 A1 * | 3/2010 | Tanaka ............... H04B 10/5053 398/102 |
| 2010/0215373 A1 | 8/2010 | Hideyuki et al. |

FOREIGN PATENT DOCUMENTS

| CA | 2850910 A1 | 4/2013 |
| WO | 0167643 A2 | 9/2001 |

OTHER PUBLICATIONS

F. Baronti et al. "SNR enhancement of Raman-based long-range distributed temperature sensors using cyclic Simplex codes" Electronics Letters, Aug. 19, 2010, vol. 46, No. 17, pp. 1221-1223, XP002613245.

(Continued)

*Primary Examiner* — Seung C Sohn
(74) *Attorney, Agent, or Firm* — Cantor Colburn LLP

(57) ABSTRACT

A method for measuring a distributed physical value of an optical device under test (DUT), includes the steps of: launching into the DUT a probe signal that includes a plurality of optical pulses at at least one test wavelength, and receiving at least one optical signal backscattered by the DUT, wherein the optical pulses are obtained with at least the following steps: generating a first time sequence of first pulses that corresponds to a word of a first code, the first time sequence lasting not shorter than a time of flight and being formed by a number of time slots that is equal to the (Continued)

number of bits of the word of the first code; generating a second time sequence of second pulses that corresponds to a word of a second code; and amplitude modulating the second time sequence with the first time sequence.

16 Claims, 6 Drawing Sheets

(58) Field of Classification Search
USPC .................................................. 250/227.14
See application file for complete search history.

(56) References Cited

OTHER PUBLICATIONS

Farhan Zaidi et al. "High Performance Time Domain FBG Dynamic Interrogation Scheme Based on Pulse Coding", IEEE Photonics Technology Letters, Jan. 15, 2013, vol. 25, No. 5, pp. 460-463, XP011493277.
G. Bolognini et al. "Performance enhancement of Raman-based distributed temperature sensors using simplex codes", 2006 Optical Fiber Communication Conference and The National Fiber Optic Engineers Conference, Mar. 5, 2006, pp. 3, XP055159584.
International Search Report dated Aug. 20, 2015 re: Application No. PCT/EP2015/063365; pp. 1-4.
M.A. Soto et al. "Distributed temperature sensor system based on Raman scattering using correlation-codes", Electronics Letters, Aug. 2, 2007, vol. 43, No. 16, pp. 862, XP055159583.
Written Opinion dated Aug. 20, 2015 re: Application No. PCT/EP2015/063365; pp. 1-7.

* cited by examiner

METHOD AND APPARATUS FOR MEASURING A DISTRIBUTED PHYSICAL VALUE OF AN OPTICAL DEVICE UNDER TEST

TECHNICAL FIELD

The present disclosure relates to a method and an apparatus for measuring a distributed physical value of an optical device under test (DUT).

BACKGROUND

The traditional techniques of optical time domain reflectometry (OTDR) involve the use of a single optical pulse, produced by a laser source, which is coupled to a DUT, for example an optical fiber, or another dielectric waveguide, within which the pulse propagates; the energy of this pulse is partially backscattered during its path owing to physical phenomena that occur in the structure of the DUT, in particular owing to the inelastic scattering known as "Raman scattering".

The inelastic backscattering processes owing to Raman interaction generate two spectrally-separate components of the optical response, respectively called "Anti-Stokes Raman line" (AS) and "Stokes Raman line" (S), which are shown in FIG. 1 with reference to the wavelength $\lambda_T$ of the laser source.

It is known that the intensity of the backscattered Anti-Stokes line (at the wavelength $\lambda_{AS}$) depends on the temperature, which can thus be measured from this intensity. It is likewise known that in order to effectively distinguish the variations of temperature from the variations of loss along the optical fiber probe, usually what is monitored is the ratio of the intensity of the Anti-Stokes ($\lambda_{AS}$) and Stokes ($\lambda_S$) Raman lines, or, alternatively, the ratio of the intensity of the Anti-Stokes line ($\lambda_{AS}$) and the backscattered Rayleigh line at the same wavelength $\lambda_T$ of the laser source.

The backscattered optical power is measured by the apparatus and is then related to the time elapsed since the moment of coupling to fiber of the optical pulse, in order to obtain its spatial distribution.

The duration of the measurement of backscattering (this measurement is also known as "OTDR trace") depends directly on the length of the DUT and is called "time of flight". The total measurement time, on the other hand, which is necessary for the apparatus to reconstruct the spatial distribution of the physical parameter along the DUT, is represented by an integer multiple of the above mentioned time of flight, since, in general, measurement apparatuses collect multiple acquisitions of OTDR traces in order to calculate an average of them.

Such techniques are widely applied in telecommunications and also in the field of civil and industrial engineering, in apparatuses adapted to monitor very large structures, such as motorway and rail tunnels, oil and gas pipelines, power lines and large-scale industrial plants in general. In particular, such apparatuses usually comprise an optoelectronic measurement device provided with an optical fiber probe (DUT or Device Under Test) of considerable extension, usually of the order of a few tens of kilometers. In use, such optical fiber is stably coupled to and kept substantially in contact with portions or components of the engineering structure of which it is intended to monitor the respective physical parameters, such as the temperature.

The performance levels that can be obtained with traditional OTDR techniques are mainly limited by the energy of the optical pulse. Such energy is limited both by the maximum peak power of the optical pulse that can be generated with commercial laser sources and which can be used without incurring unwanted non-linear effects, and also by its duration, which cannot be increased without consequently worsening the spatial resolution of the measurement, i.e. the minimum portion in length of DUT on which it is possible to measure the physical parameter in question. So there is a typical trade-off between spatial resolution (i.e. the minimum spatial extension of a peak that can be measured with accuracy) and the signal-to-noise ratio (SNR) (i.e. the precision with which the measurement is made).

In order to overcome such limitations, it has been proposed to couple not a single optical pulse to the DUT but a suitable binary sequence of optical pulses, which is selected from families of pseudorandom codes or of complementary correlation codes. In this case, the trend over time of the backscattered optical power measured by the apparatus is given by the linear sum of the optical backscatter responses of each individual pulse that constitutes the code word. The optical backscatter response of the single pulse, which is generally used in order to obtain the spatial distribution of the physical value of the DUT, is then found using a decoding operation which depends on the type of code that was selected.

The coding gain (CG), which is defined as the ratio, for the same measurement time, of the SNR obtained with the encoding technique to the SNR obtained with the single pulse technique, has a trend as the length L of the code word varies, which shows that the improvements in SNR of the measurement apparatus decrease as L increases. Increasing the length of the code word L has the disadvantage of also increasing the duration of the time of flight, and consequently the total measurement time, by a time $t_f$, which is directly proportional to L for a factor equal to the duration of the single optical pulse.

A further disadvantage of the above mentioned encoding techniques lies furthermore in the fact that the decoding operations increase in complexity quadratically with respect to the length L, and this makes the decoding operation unperformable by commercial components.

Therefore, the foregoing considerations lead to the conclusion that, in practice, the above-mentioned encoding techniques are effective for word lengths L that are less than a limited value, and that commercial measurement apparatuses cannot use a length L as big as desired in order to increase their measurement distance.

The aim of the present disclosure is to provide a method and an apparatus that are capable of improving the known art in one or more of the above-mentioned aspects.

SUMMARY

Within this aim, the disclosure provides a method and an apparatus for measuring a distributed physical value of an optical device under test (DUT) in which it is possible to increase the maximum measurement distance with respect to the known systems, both single-pulse systems and systems based on correlation or pseudorandom encoding.

The disclosure also provides a method and an apparatus for measuring a distributed physical value of an optical device under test (DUT) in which it is possible to increase the coding gain with respect to the known systems, for the same maximum length of the DUT, the same spatial resolution and the same measurement time.

These advantages which will become better apparent hereinafter are achieved by providing a method and an apparatus according to the independent claims, possibly with the optional characteristics of one or more of the dependent claims.

In particular, the disclosure advantages are achieved by providing a method for measuring a distributed physical value of an optical device under test (DUT), comprising the steps of:
  launching into the DUT a probe signal that comprises a plurality of optical pulses at at least one test wavelength ($\lambda_T$),
  receiving at least one optical signal backscattered by the DUT, characterized in that the optical pulses are obtained with at least the following steps:
  generating a first time sequence of first pulses that corresponds to a word of a first code, the first time sequence having a duration not shorter than a time of flight and being formed by a number of time slots that is equal to the number of bits of the word of the first code, each time slot corresponding to a respective first pulse of the first time sequence;
  generating a second time sequence of second pulses that corresponds to a word of a second code, said second time sequence being periodic, with a period that is substantially equal to the duration of at least one of said time slots;
  amplitude modulating said second time sequence with said first time sequence.

Furthermore, advantages of the disclosure are achieved by providing an apparatus for measuring a distributed physical value of an optical device under test (DUT), comprising:
  a transmitter adapted to launch into the DUT a probe signal that comprises a plurality of optical pulses at at least one test wavelength ($\lambda_T$),
  generator means for generating a first time sequence of first pulses that corresponds to a word of a first code and a second time sequence of second pulses that corresponds to a word of a second code;
  a multiplier adapted to receive said first time sequence and said second time sequence and to multiply them together in order to obtain a modulated signal for said transmitter; and
  wherein the first time sequence has a duration not shorter than a time of flight and is formed by a number of time slots that is equal to the number of bits of the word of the first code, each time slot corresponding to a respective first pulse of the first time sequence; and wherein the second time sequence is periodic, with a period that is substantially equal to the duration of at least one of said time slots.

BRIEF DESCRIPTION OF THE DRAWINGS

Further characteristics and advantages of the disclosure will become better apparent from the description of preferred, but not exclusive, embodiments of the method and of the apparatus according to the disclosure, which are illustrated for the purposes of non-limiting example in the accompanying drawings wherein.

DETAILED DESCRIPTION OF THE DRAWINGS

Figure 1:
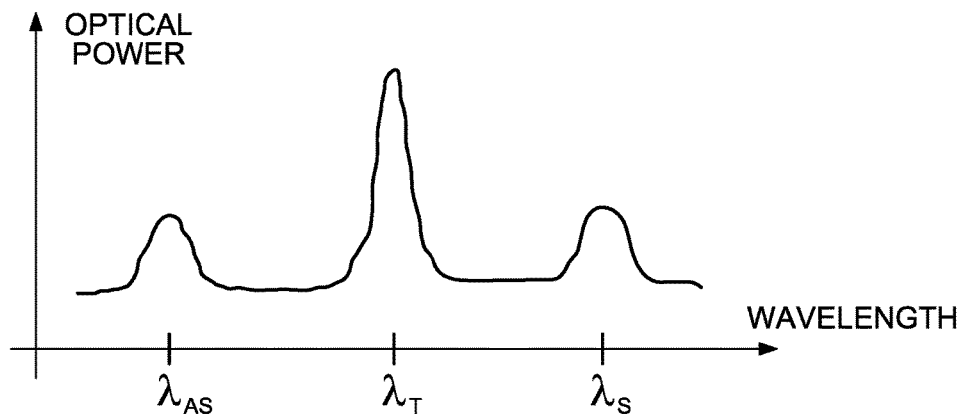
FIG. 1 shows a typical spectrum of backscattered optical power from an optical fiber in response to laser pulse at the wavelength $\lambda_T$.
Figure 2:
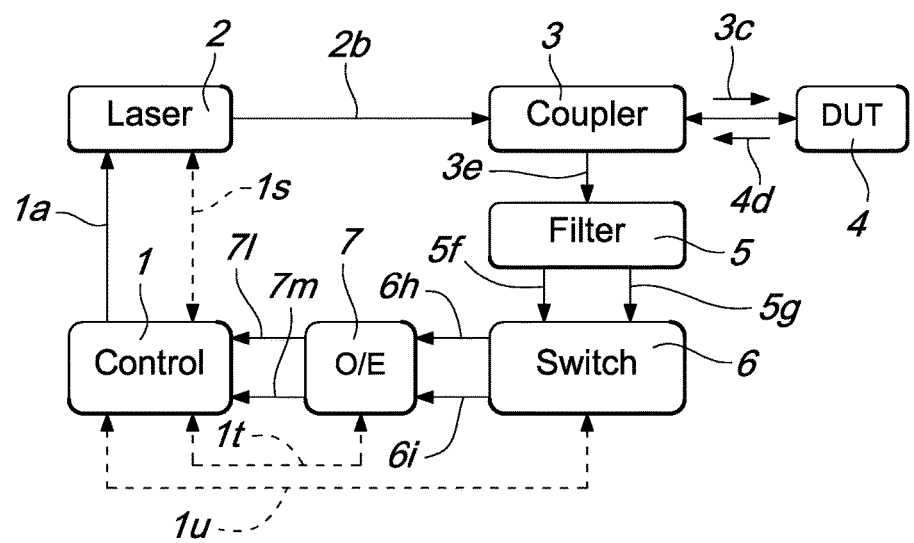
FIG. 2 is a schematic view of an apparatus according to a first embodiment of the disclosure.

With reference to the figures, the apparatus according to a first embodiment of the disclosure comprises a control and processing unit 1, which preferably is responsible not only for generating the control signals of the entire apparatus, but also for receiving the return signals containing the state information of the other components of the apparatus, to be used subsequently in the control algorithms, and also for processing the measurement data for the purpose of reconstructing the spatial distribution along the DUT 4 of the measured physical parameter. The DUT 4 is an optical device, for example an optical fiber, the extension of which depends on the engineering application for which the apparatus is used and can vary from sub-millimeter values up to hundreds of kilometers.

The control and processing unit 1 is configured to generate an electrical driving signal 1a corresponding to one or more binary sequences, which constitutes the driving signal for an optical pulse emitter 2. In particular, the optical pulse emitter 2, which can be a laser modulated in amplitude by the driving signal 1a, is adapted to receive the electrical driving signal 1a and to generate an optical signal 2b at at least one wavelength $\lambda_T$ (for example, 1550 nm), the time trend of which corresponds substantially to that of the electrical driving signal 1a and with a peak optical power of the pulses which is adequate for the correct generation, inside the DUT 4, of the physical phenomenon to be measured by the apparatus according to the disclosure, for example the temperature.

By way of example, the optical pulse emitter 2 can comprise both electronic components, such as power drivers, and optical components, such as laser diodes, fiber optic laser emitters, and optical modulators and amplifiers.

The optical signal 2b thus generated passes through a directional optical coupler 3 in order to be coupled, at the wavelength 4, with the DUT 4. A plurality of optical pulses, which constitute the optical probe signal 3c, is thus launched into the DUT 4.

In response to the optical probe signal 3c, the DUT 4 produces a backscattered optical signal 4d that propagates in the opposite direction to that of the optical pulses of the probe signal 3c and which, usually, has a different optical spectrum from that of the optical pulses. In particular, the interaction between the probe signal 3c at the wavelength $\lambda_T$ with the DUT 4 produces physical phenomena of backscattering: elastic in the case of the Rayleigh backscattering, in which the backscattered optical power is distributed on a band in the neighborhood of the wavelength $\lambda_T$; inelastic in the case of the Raman backscattering, in which the backscattered optical power is distributed on the two bands corresponding to the neighborhoods of the Stokes wavelength $\lambda_S$ and the anti-Stokes wavelength $\lambda_{AS}$ which differ from $\lambda_T$. A qualitative chart of the spectrum of the backscattered signal 4d is shown in FIG. 1.

The directional coupler 3 can be used to receive the backscattered optical signal 4d from the DUT 4 and route it to a wavelength-selective optical filter 5. The selective optical filter 5 is adapted to extract from the respective incoming signal 3e, which was routed by the coupler 3 starting from the backscattered optical signal 4d, the optical backscatter responses 5f and 5g corresponding respectively to the two sole bands in the neighborhood of the anti-Stokes wavelength $\lambda_{AS}$ and the Stokes wavelength $\lambda_S$.

The selective filter 5 can be adapted to extract, in addition or as an alternative to the optical backscatter response 5f or 5g in the neighborhood of the anti-Stokes or Stokes wavelength, the optical backscatter response 5n in the neighborhood of the Rayleigh wavelength $\lambda_T$.

Returning to the first embodiment, the apparatus can comprise an optical switch 6 with two inputs and two outputs, which is adapted to receive in input the optical backscatter responses 5f and 5g and route them, as a function of a state signal 1u generated by the control and processing unit 1, according to the two possible different optical paths. In particular, for a determined value of the state signal 1u, the optical switch 6 routes the optical signals 5f and 5g to its outputs 6h and 6i, respectively, while for a second value of the state signal 1u, the optical switch 6 routes the optical signals 5f and 5g to the outputs 6i and 6h, respectively.

The outputs 6h and 6i are connected as input to an optical-to-electrical converter 7, which is adapted to convert the time-continuous optical signals at the inputs 6h and 6i to output analog electrical signals 7l and 7m respectively, by way of optoelectronic circuitry which is substantially made up of photodiodes and voltage and transimpedance amplifiers.

The control and processing unit 1 is adapted to receive at the input such analog electrical signals 7l and 7m and to convert them to digital signals, so as to process them in order to reconstruct the spatial distribution along the DUT 4 of the physical parameter to be measured, for example the temperature.

A further function that can be carried out by the control and processing unit 1 is that of receiving and controlling the statuses of the functional blocks 2, 6 and 7 by way of the respective state signals 1s, 1u and 1t. In particular the control and processing unit 1 can be configured to read the functional state of the individual blocks, to change it by way of adapted control parameters and finally to verify any malfunctions.

Figure 3:
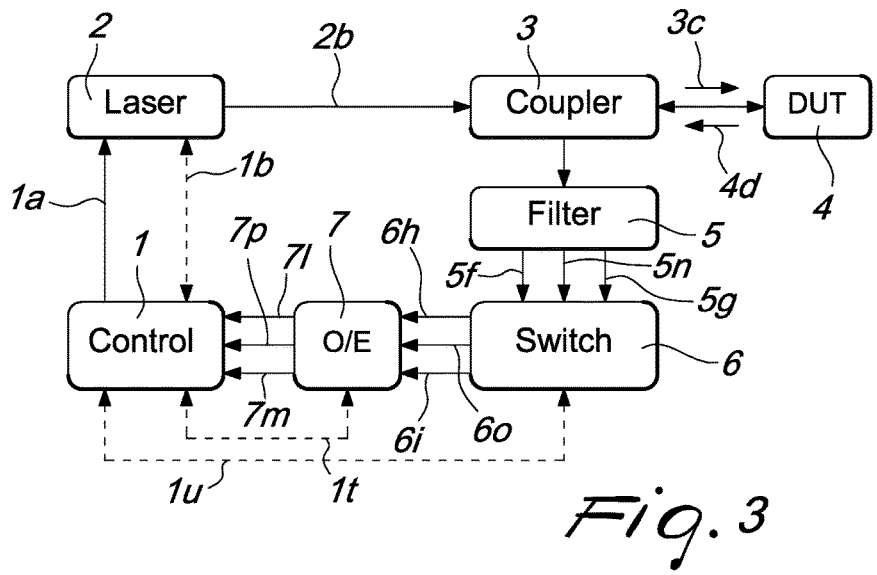
FIG. 3 is a schematic view of an apparatus according to a second embodiment of the disclosure.

In the second embodiment of the apparatus, shown in FIG. 3, the components used are substantially the same, and for this reason the same reference numerals are indicated or are not repeated. The only difference is that the components 1, 5, 6 and 7 are adapted to detect the Rayleigh optical backscatter response as well, so as to be able to measure more than one physical parameter of the DUT 4.

In particular, in the second embodiment of the apparatus according to the disclosure, the selective optical filter 5 has a third optical output 5n for the Rayleigh optical backscattered response, so as to be able to simultaneously extract the three backscatter power levels (anti-Stokes, Stokes, and Rayleigh). Furthermore, the optical switch 6 of the second embodiment has a further input, which corresponds to the third optical output 5n, and a further output 6o and is configured to assume six different optical configurations, on the basis of the state signal 1u originating from the control and processing unit 1, in each one of which the input signals 5f, 5g and 5n can be routed respectively to each one of the outputs 6h, 6i, 6o.

The optical-to-electrical converter 7 of the second embodiment has a third conversion channel, similar to those already present in the first embodiment, which thus enables the simultaneous conversion of three backscatter power levels.

Finally, the control and processing unit 1 of the second embodiment, with respect to the first embodiment, comprises a third acquisition channel so as to be able to simultaneously convert all three backscatter power levels (anti-Stokes, Stokes and Rayleigh) to digital and consequently process them.

The electrical driving signal 1a, in input to the optical pulse emitter 2, is constituted by binary sequences and the pulse emitter 2 is adapted to produce corresponding optical binary sequences, thus associating two different levels of power with the logical levels of the electrical driving signal 1a.

The electrical driving signal 1a is generated, according to the disclosure, by way of a space-time encoding scheme implemented by the control and processing unit 1, which is advantageously divided into two sub-systems which are dedicated respectively to the generation of the driving binary sequence of the optical pulse emitter 2 and to the sampling and decoding operations of the signals originating from the optical-to-electrical converter 7.

In particular, the control and processing unit 1 comprises a sequence generator 11 which is adapted to generate at least two binary sequences, in particular a first time sequence of first pulses SC1 and a second time sequence of second pulses SC2.

Primarily, one and only one word of a first code, in particular of a binary cyclic code C1 composed of exactly a number N1 of bits, is stored in the sequence generator 11. The word of the first code C1 can be, for example but not necessarily, a maximum length sequence (MLS).

Starting from such word of the first code C1, the sequence generator 11 generates, in a step 101, a first time sequence SC1(t) of first pulses, which represents the spatial component of the space-time encoding according to the disclosure. Such sequence is defined by a number N1 of time slots of substantially identical duration D1, so that there is a one-to-one correspondence between the nth time slot of the sequence SC1(t) and the nth bit $b_n$ of the word of the first code C1. In particular, the time trend of an example sequence SC1(t), shown in FIG. 4, can be defined with the following expression:

$$SC1(t) = \sum_{n=0}^{N1-1} b_n g(t - nD1)$$

where $b_n$ is the nth bit of the word of the first code C1 and g(t) is a rectangular pulse of uniform amplitude and time duration D1=T/N1, where T is the time of flight or a value greater than the time of flight.

Starting from the time duration D1, a word of a second binary code C2 is defined which is composed of exactly a number of bits N2 and which belongs, for example, to the class of Golay code words, or complementary correlation code words, or Simplex code words, or to other types of codes which are commonly used in the sector of OTDR reflectometry. Starting from such word of the second code C2, the sequence generator 11 generates, in a step 102, a second time sequence SC2(t) of second pulses, which is periodic with a period D1 and which represents the time component of the space-time encoding according to the disclosure. The word of the second code C2 is constituted, within each period D1, by the same number N2 of time slots of uniform duration equal to D2, so as to establish a one-to-one correspondence between the nth time slot of the sequence SC2(t) and the nth bit $c_k$ of the word of the second code C2.

In particular, the duration D2 determines the spatial resolution of the measurement made by the measurement apparatus according to the disclosure: by using for example sequences with time slots with duration D2 equal to 10 ns, a spatial resolution of measurement equal to 1 m is obtained. The time trend of the sequence SC2(t), shown in FIG. 4, can be defined with the following expression:

$$SC2(t) = \sum_{n=0}^{N1-1} \sum_{k=0}^{N2-1} c_k p(t - kD2 - nD1)$$

where $c_k$ is the kth bit of the code word C2 and p(t) is a rectangular pulse of uniform amplitude and time duration D2. At this point it should be pointed out that the time duration D2 and the number of bits N2 must be defined so that their product D2·N2 is less than or equal to D1.

The second time sequence SC2(t) can be made periodic with a period D1 by a feedback, delay cell device 12 (PER) which is connected to an output of the sequence generator 11. The same device 12 or a similar device can be optionally used to render the first time sequence SC1(t) periodic as well, according to a period that is greater than or equal to the time of flight T.

Figure 4:
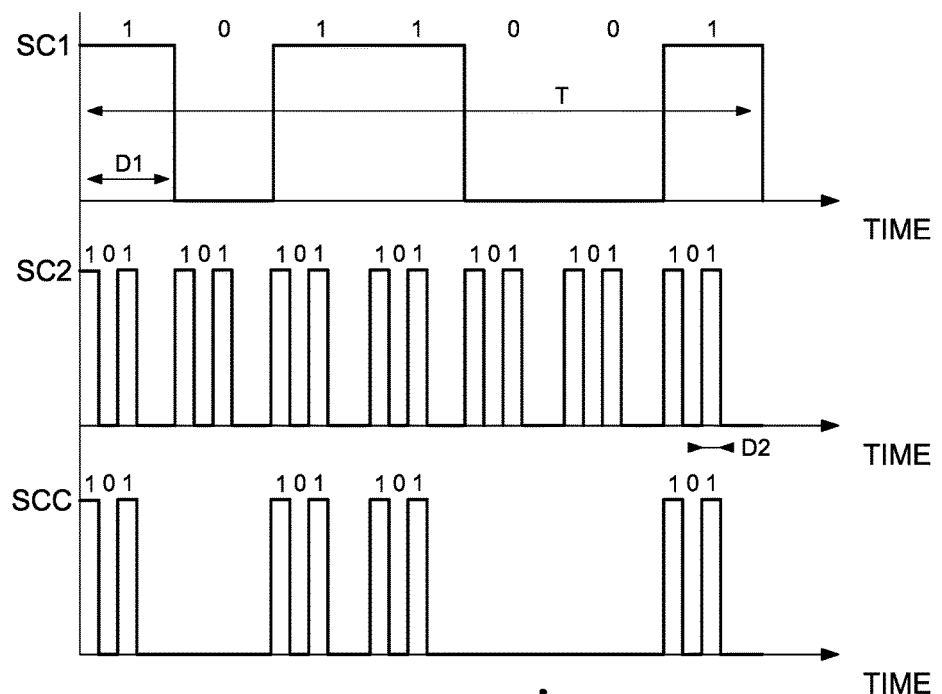
FIG. 4 shows the first time sequence of pulses, the second time sequence of pulses, and the signal obtained by modulating the second sequence with the first, to be optically converted for launch into the fiber.

According to the disclosure, in a step 103, the second time sequence SC2(t) is modulated in amplitude by the first time sequence SC1(t) in order to generate an aperiodic sequence SCC(t) which, as shown in FIG. 4, is composed of a train of sequences which are defined by the word of the second code C2 repeated in every nth time slot of the sequence SC1(t) for which the corresponding nth bit $b_n$ of the word of the first code C1 has a non-zero value.

The amplitude modulation can be obtained by multiplying the two sequences SC1(t) and SC2(t) using a first processor 13 which receives the two sequences as input, multiplies them together and generates the sequence SCC(t) as output, which is sent in input to a D/A converter 14 in order to obtain, in output, the electrical driving signal 1a.

The electrical driving signal 1a corresponds to the sequence SCC(t), which, in a step 104, is converted by the optical pulse emitter 2 to an optical signal 2b which comprises the train of optical pulses that make up the probe signal 3c at the wavelength $\lambda_T$ and corresponding to SCC(t).

However, it should be noted that the choice to emit radiation at a single wavelength is not a limitation of the present disclosure, which can also be correctly implemented by producing the electromagnetic radiation simultaneously on multiple wavelengths. Therefore, the optical power of the optical probe signal 3c associated with each sequence SCC (t) of the driving signal 1a will have a time trend such that, at each moment in time, the presence of an optical pulse with peak power P0 will be associated exclusively with the non-zero values of the sequence SCC(t).

Figure 8:
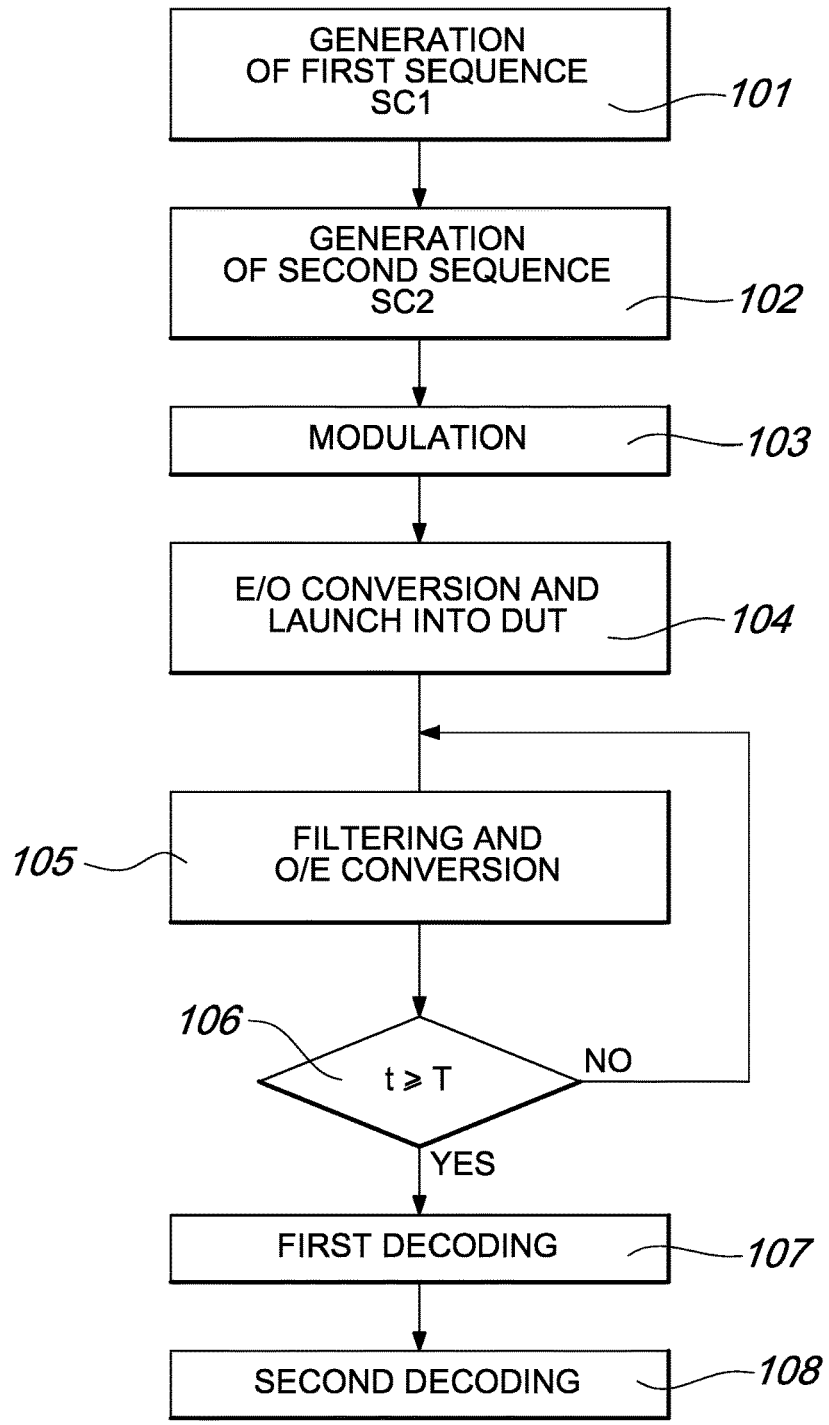
FIG. 8 is a flowchart of a method according to the disclosure.

In the method according to the disclosure, preferably a period is defined with which the sequences of pulses SCC(t), converted to the electrical driving signal 1a by the D/A converter 14, are generated periodically. In more detail, such period is determined primarily by the length L of the DUT 4. For example, using an optical fiber as the DUT, it is necessary to operate so that each sequence of pulses launched into the fiber propagates completely along the optical fiber and the corresponding backscatter returns to the transmitter without any overlap between successive sequences (steps 105 and 106 in FIG. 8, in which T indicates such a period, corresponding to the time of flight). For example, if we consider an optical fiber of length 80 km and a speed of propagation of the signals in fiber equal to $2 \times 10^8$ m/sec, the repetition period of the sequence SCC(t) must be not shorter than 800 µs and the repetition frequency must be not greater than 1.25 kHz.

The propagation of the sequence of optical pulses 3c in the DUT 4 through the directional optical coupler 3 generates electromagnetic radiations 4d which are backscattered by the successive portions of the DUT 4 as the sequence of pulses propagates along the extension of the DUT 4. In particular, the electromagnetic radiations resulting from the inelastic Raman scattering at the wavelengths $\lambda_{AS}$ and $\lambda_S$ of the anti-Stokes and Stokes components, respectively, are of particular interest to measuring physical characteristics of the DUT 4. Such respective electromagnetic radiations deriving from the inelastic anti-Stokes and Stokes Raman scattering are what is coupled to the apparatus through the directional optical coupler 3 and thus separated from other radiations backscattered through the wavelength-selective optical filter 5.

As specified earlier, in the second embodiment of the disclosure the Rayleigh optical backscattered response can also be acquired and processed. The Rayleigh backscatter radiation is characterized by an emission spectrum centered on the same wavelength $\lambda_T$ as the signal generated by the optical pulse emitter 2, while its intensity and phase are strongly dependent on mechanical stresses with static and dynamic evolution over time induced on the DUT 4. By simultaneously analyzing, by way of the second embodiment of the disclosure, the time trends of the power levels of the Rayleigh and Raman backscatter signals it is possible to extract, in a distributed manner, information on additional physical characteristics with respect to the temperature, such as for example mechanical stresses with frequency components belonging to the acoustic emission spectrum.

In step 105 the backscattered optical responses 5f and 5g (and optionally 5n) thus filtered are fed to the optical-to-electrical converter 7, which is configured to convert the incident electromagnetic radiation to electrical signals, by way of the optical switch 6 in order to alternately distribute the backscatter signals on the input branches of the optical-to-electrical converter 7 on the basis of the state signal 1u sent by the control and processing unit 1.

However it should be noted that the optical coupling between the wavelength-selective optical filter 5 and optical-to-electrical converter 7, which coupling is provided by way of the optical switch 6, is not a limitation of the present disclosure, which can also be correctly implemented using an optical coupling of the static mechanical type.

The electrical signals 7l and 7m generated by the optical-to-electrical converter 7 are transmitted to the control and processing unit 1, which conveniently comprises a sampler 15 which is adapted to execute the sampling and the analog-to-digital conversion of the electrical signals 7l and 7m at a high time resolution and to provide corresponding digitized signals to a space-time decoder 16, which is configured to implement the steps of decoding according to the disclosure and enable the control unit 1 to obtain the measurement of the trend of the optical power over time of the signals 5*f* and 5*g* at the anti-Stokes and Stokes Raman wavelengths of interest.

The space-time decoder 16 is configured to execute two successive decoding steps. In more detail, as shown in FIG. 5, in response to the sequence of optical pulses 3*c* corresponding to the signal SCC(t), the DUT 4 generates backscatter signals at the wavelengths of interest for the present disclosure, which are constituted by the superimposition 51 of the OTDR signals obtained as a response to the individual sequences of optical pulses sent at the "1" bits of the word of the first code C1.

Figure 5:
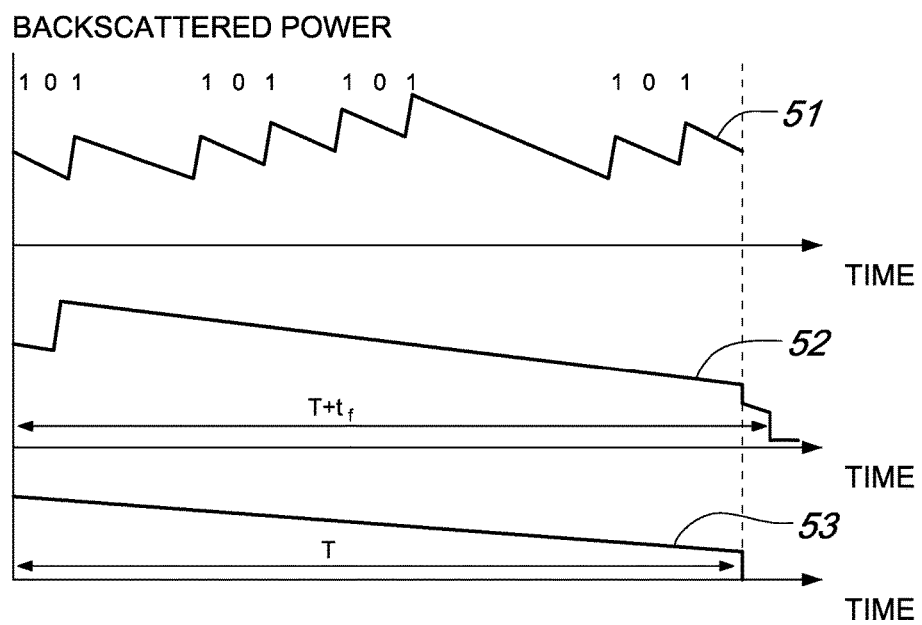
FIG. 5 shows the traces of the optical response of the DUT with respect to the probe signal, after the first decoding step and at the end of the decoding process according to the disclosure.
Figure 6:
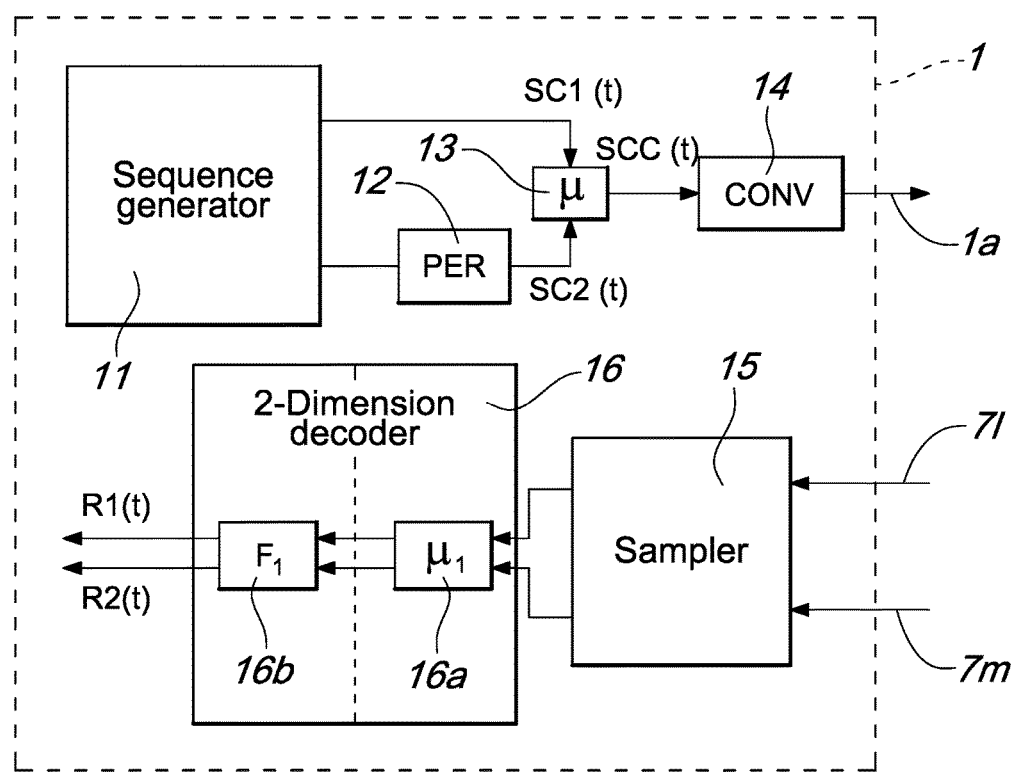
FIG. 6 is a schematic view of the control and processing unit in FIG. 2.

The first decoding step 107 implemented by the decoder 16, and in particular by a second processor 16*a* which may possibly coincide with the microprocessor 13, reconstructs the response 52 of the DUT 4 to the individual period of the sequence SC2(*t*) defined by the word of the second code C2 as shown in FIG. 5.

In particular, the portion of the backscatter signal 51 for a given time slot of duration D1 is constituted by the linear sum, weighted according to the word of the first code C1, of all the portions of that backscatter signal 51. Such sum leads to a linear algebraic system of the same size as the number of time slots N1, the associated matrix of which is of the circulating type.

In essence, the processor 16*a* implements the first step of the decoding method by executing algebraic operations comparable to a single product between a matrix defined as a function of the word of the first code C1 and a vector that collects the samples of the backscatter signal which were acquired through the sampler 15.

The second decoding step 108 makes it possible to reconstruct the responses 53 of the DUT 4 to the individual pulse of the sequence SCC(t). In particular, the output signals from the first decoding step represent the response of the DUT 4 to the individual period of the second time sequence SC2(*t*) encoded in accordance with the word of the second code C2. Since such code word C2 belongs preferably, but not necessarily, to the class of complementary correlation code words, the decoder 16 implements the corresponding decoding algorithm by calculating the normalized cross-correlation function between the signals generated by the first decoding step and the signal defined by the individual period of the second time sequence SC2(*t*). To this end, the decoder 16 can further comprise a FIR (Finite Impulse Response) filter 16*b* in output to the second processor 16*a*, in which the coefficients of the FIR filter 16*b* are determined by the word used of the second code C2.

Thus signals R1(*t*) and R2(*t*) are obtained which represent the time trend of the backscatter power levels of the anti-Stokes and Stokes Raman components, which can be used to measure, for example, the space-time distribution of the temperature of the DUT 4.

Preferably, the same sequence of optical pulses 3*c* can be transmitted periodically at intervals of a time duration that is not shorter than the time of flight T for the purpose of collecting multiple acquisitions of the backscatter signals in a memory of the control and processing unit 1 in order to carry out an averaging process thereof.

Furthermore, in order to implement the second decoding step and render it accurate, the optical pulse emitter 2 can advantageously be driven by electrical signals 1*a* so as to periodically send a multiplicity of sequences SCC(t) with a period that is not shorter than the time of flight T which are obtained by amplitude modulating, in accordance with the same word of the first code C1, periodic sequences SC2(*t*) which are defined by a plurality of words of the second code C2.

If we consider a plurality of complementary correlation code words, the response to the individual pulse of the DUT 4 is obtained by implementing the same decoding steps for each different word used of the second code C2 and summing the corresponding normalized cross-correlation functions calculated in output at the second decoding step 16*b*.

Differently from the known OTDR techniques based on encoding methods, the method according to the disclosure advantageously uses a decoding procedure which is based on two successive steps. In particular, since there is one and only one sequence SC1(*t*), irrespective of the number of bits in that sequence, and the associated decoding matrix is a circulating matrix, the corresponding decoding step can occur in a single time of flight.

As said above, the decoding time, and thus the total measurement time, depends exclusively on the number of words of the second code C2 that are used to improve, if necessary, the accuracy of the second decoding step.

The method according to the disclosure provides a coding gain that, on a linear scale, is defined by the product of the coding gains of the corresponding encoding techniques applied to the two decoding steps 107 and 108. For example, if the sequence SCC(t) is implemented by applying a word of the first code C1 of length N1 belonging to the class of maximum length sequences (MLS) and a word of the second code C2 of length N2 belonging to the class of complementary correlation codes, the total coding gain CG is equal to:

$$C_G = \frac{N1+1}{2\sqrt{N1}} \cdot \frac{\sqrt{N2}}{2}$$

Figure 7:
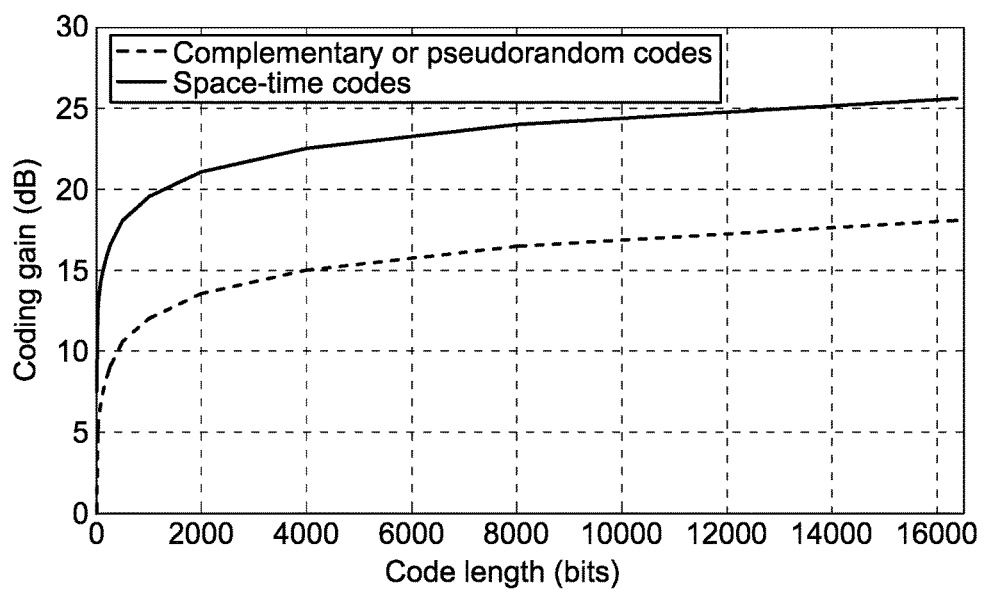
FIG. 7 shows the trend of the coding gain according to the disclosure (continuous line) and according to the prior art as a function of the length of the code word used.

FIG. 7 shows the comparison between the trends of the coding gains for the same measurement time of a known complementary correlation encoding method (dotted line) and of the method according to the disclosure, as the number of bits of the code word varies. In particular, the X-axis represents the length of the code word for the known complementary correlation encoding method, while in the method according to the disclosure the X-axis represents the length of the sole word of the second code C2. The coding gain curve for the method according to the disclosure is obtained using a constant length of the word of the first code C1, equal to N1=127 bits, and varying the length N2 of the word of the second code C2. As can be seen from the comparison between the curve of the coding gains in FIG. 7, thanks to the use of the second encoding step which corresponds to the spatial component, the encoding method according to the disclosure introduces an increase in coding gain of 7.5 dB. Therefore, for the same maximum length of the DUT, the same spatial resolution and the same measurement time, the method according to the disclosure allows an increase of the SNR which can be used, for example, to provide a system for the distributed monitoring of physical parameters along a DUT of greater lengths than in systems based on standard single-pulse OTDR techniques and in systems based on correlation encoding techniques. By way of example, by using the method according to the disclosure with a word of the first code C1, of MLS type, of length N1 equal to 1023 bits and a word of the second, complementary correlation code C2 of length N2 equal to 1024 bits, an absolute value of the coding gain equal to 24 dB is obtained, and an improvement of the coding gain equal to about 12 dB, which is equivalent to an increase of 30 km in terms of monitoring distance (assuming an attenuation coefficient in fiber equal to 0.2 dB/km) with respect to an apparatus based on conventional complementary correlation encoding techniques, of which commercial implementations reach a maximum measurement distance of a few tens of kilometers.

In practice it has been found that the apparatus and the method according to the disclosure fully achieve the set aim.

The method and the apparatus according to the disclosure, thus conceived, are susceptible of numerous modifications and variations. Moreover, all the details may be substituted by other, technically equivalent elements.

The invention claimed is:

1. A method for measuring a distributed physical value of an optical device under test (DUT), the method including the steps of:
    launching into the DUT a probe signal that comprises a plurality of optical pulses at at least one test wavelength,
    receiving at least one optical signal backscattered by the DUT,
    wherein the optical pulses are obtained with at least the following steps:
    generating a first time sequence of first pulses that corresponds to a word of a first code, the first time sequence having a duration not shorter than a time of flight and being formed by a number of time slots that is equal to the number of bits of the word of the first code, each time slot corresponding to a respective first pulse of the first time sequence;
    generating a second time sequence of second pulses that corresponds to a word of a second code, said second time sequence being periodic, with a period that is substantially equal to the duration of at least one of said time slots; and
    amplitude modulating said second time sequence with said first time sequence.

2. The method according to claim 1, wherein said first code is a cyclic code, preferably a maximum length sequence.

3. The method according to claim 1, wherein said second code is a complementary correlation code, a pseudorandom code, a Golay code, a CCPONS code (complementary correlated Prometheus orthonormal sequence), or a Simplex code.

4. The method according to claim 1, wherein said step of receiving at least one optical signal backscattered by the DUT further includes the acquisition of a backscattered anti-Stokes Raman component and of one or both of a Stokes Raman component and a Rayleigh component.

5. The method according to claim 1, wherein said step of receiving at least one optical signal backscattered by the DUT includes:
    a first decoding step adapted to reconstruct the response of the DUT to the second pulses of an individual period of the second time sequence; and
    a second decoding step adapted to reconstruct the response of the DUT to the individual second pulse of the second time sequence.

6. The method according to claim 5, wherein said first decoding step comprises an operation of cross-correlation between the second pulses of the individual period of the second time sequence and said at least one optical signal backscattered by the DUT.

7. The method according to claim 1, wherein said probe signal is transmitted periodically with a period that is not shorter than said time of flight, said step of receiving at least one optical signal backscattered by the DUT comprising a step of averaging the backscattered optical signals.

8. The method according to claim 7, wherein said word of the second code is changed at each period of repetition of said probe signal.

9. An apparatus for measuring a distributed physical value of an optical device under test (DUT), the apparatus comprising:
    a transmitter adapted to launch into the DUT a probe signal that comprises a plurality of optical pulses at at least one test wavelength,
    generator means for generating a first time sequence of first pulses that corresponds to a word of a first code and a second time sequence of second pulses that corresponds to a word of a second code;
    a multiplier adapted to receive said first time sequence and said second time sequence and to multiply them together in order to obtain a modulated signal for said transmitter;
    wherein the first time sequence has a duration not less than a time of flight and is formed by a number of time slots that is equal to the number of bits of the word of the first code, each time slot corresponding to a respective first pulse of the first time sequence; and
    wherein the second time sequence is periodic, with a period that is substantially equal to the duration of at least one of said time slots.

10. The apparatus according to claim 9, wherein said first code is a cyclic code, preferably a maximum length sequence.

11. The apparatus according to claim 9, wherein said second code is a complementary correlation code, a pseudorandom code, a Golay code, a CCPONS code (complementary correlated Prometheus orthonormal sequence), or a Simplex code.

12. The apparatus according to claim 9, wherein said transmitter is configured to launch said probe signal into the DUT periodically, with a period that is not shorter than said time of flight.

13. The apparatus according to claim 9, wherein said generator means are configured to change said word of the second code at each period of repetition of said probe signal.

14. The apparatus according to claim 9, further comprising an optoelectronic receiver, which can be connected to the DUT and is adapted to receive at least one optical signal backscattered by the DUT, said optoelectronic receiver comprising at least one decoder which is configured to perform:
    a first decoding step adapted to reconstruct the response of the DUT to the second pulses of an individual period of the second time sequence; and
    a second decoding step adapted to reconstruct the response of the DUT to the individual second pulse of the second time sequence.

15. The apparatus according to claim 14, wherein said first decoding step comprises an operation of cross-correlation between the second pulses of the individual period of the second time sequence and said at least one optical signal backscattered by the DUT.

16. The apparatus according to claim 14, wherein said optoelectronic receiver further comprises at least one optical filter for selecting from said at least one backscattered optical signal a backscattered anti-Stokes Raman component and one or both of a Stokes Raman component and a Rayleigh component.

* * * * *